US009543807B2

(12) United States Patent
Linnemann Nielsen et al.

(10) Patent No.: US 9,543,807 B2
(45) Date of Patent: Jan. 10, 2017

(54) ELECTRIC MOTOR

(75) Inventors: Niels Erik Linnemann Nielsen, Aars (DK); John B. Jacobsen, Bjerringbro (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 0 days.

(21) Appl. No.: 14/241,637

(22) PCT Filed: Aug. 28, 2012

(86) PCT No.: PCT/EP2012/066665

§ 371 (c)(1),
(2), (4) Date: May 19, 2014

(87) PCT Pub. No.: WO2013/030181

PCT Pub. Date: Mar. 7, 2013

(65) Prior Publication Data

US 2014/0300221 A1 Oct. 9, 2014

(30) Foreign Application Priority Data

Aug. 29, 2011 (EP) .................................... 11179208

(51) Int. Cl.
*H02K 9/00* (2006.01)
*H02K 9/19* (2006.01)
*H02K 9/12* (2006.01)
*H02K 9/10* (2006.01)
*H02K 5/22* (2006.01)

(52) U.S. Cl.
CPC ................ *H02K 9/00* (2013.01); *H02K 5/225* (2013.01); *H02K 9/10* (2013.01); *H02K 9/12* (2013.01); *H02K 9/19* (2013.01); *H02K 11/33* (2016.01)

(58) Field of Classification Search
CPC .............. H02K 9/00; H02K 9/12; H02K 9/10; H02K 9/14; H02K 9/18; H02K 9/19; H02K 11/33; H02K 5/225
USPC ......................... 310/52, 54, 58, 59, 60 R, 64
See application file for complete search history.

(56) References Cited

U.S. PATENT DOCUMENTS 3,075,107 A * 1/1963 Eis ........................... H02K 9/22 310/260
3,383,529 A * 5/1968 Baumann et al. .............. 310/52
4,963,778 A 10/1990 Jensen et al.
(Continued)

FOREIGN PATENT DOCUMENTS

CN 101057385 A 10/2007
CN 101938191 A 1/2011
(Continued)

OTHER PUBLICATIONS

Krompas, Martin, Electrodynamic motor to act as a synchronous, asychronous or direct current motor, Oct. 6, 2005, Sensor Technik Wiedemann GMBH, DE102004013719.*
(Continued)

*Primary Examiner* — Terrance Kenerly
*Assistant Examiner* — Alexander Singh
(74) *Attorney, Agent, or Firm* — McGlew and Tuttle, P.C.

(57) ABSTRACT

An electric motor includes a motor housing (1) and a further housing (6), in which electrical and/or electronic components (7) are arranged. A fluid-leading channel circuit is provided for cooling these components (7) and conductively connects the inside of the motor hosing (1) to the inside of the further housing (6).

18 Claims, 4 Drawing Sheets

(56) References Cited

U.S. PATENT DOCUMENTS

| | | | | |
|---|---|---|---|---|
| 5,557,153 | A * | 9/1996 | Zimmermann | H02K 9/26 310/56 |
| 7,701,096 | B2 * | 4/2010 | Noda | B61C 9/50 310/57 |
| 8,810,087 | B2 * | 8/2014 | Dorr | H02K 9/10 310/59 |
| 2004/0160134 | A1 * | 8/2004 | Blatter et al. | 310/52 |
| 2007/0063594 | A1 * | 3/2007 | Huynh | H02K 9/06 310/59 |
| 2012/0326540 | A1 | 12/2012 | Dorr | |

FOREIGN PATENT DOCUMENTS

| | | | | |
|---|---|---|---|---|
| DE | 36 42 724 | C2 | 12/1989 | |
| DE | 10 2004 013719 | A1 | 10/2005 | |
| DE | 102004013719 | A1 * | 10/2005 | |
| DE | 10 2007 021917 | A1 | 11/2008 | |
| DE | 10 2007 034013 | A1 | 1/2009 | |
| DE | 10 2010 002068 | A1 | 8/2011 | |
| DE | WO 2011101186 | A1 * | 8/2011 | H02K 9/10 |
| FR | 560 950 | A | 10/1923 | |

OTHER PUBLICATIONS

Dorr Gerhard, Motor Unit, Aug. 25, 2011, Siemens AG, WO 2011101186A1.*

* cited by examiner 1
2
3
4
5
6
7
8
9
10
13
14
16

1'
2
3
4
5
6
6"
7
13
14
15
15'
17
18
19
20

1"
3
15"
5
23
22
21
20"
19"

ELECTRIC MOTOR

CROSS REFERENCE TO RELATED APPLICATIONS

This application is a U.S. National Phase Application of International Application PCT/EP2012/066665 filed Aug. 28, 2012 and claims the benefit of priority under 35 U.S.C. §119 of European Patent Application 11 179 208.1 filed Aug. 29, 2011, the entire contents of which are incorporated herein by reference.

FIELD OF THE INVENTION

The invention relates to an electric motor with a motor housing and with a further housing, which comprises electric and/or electronic components and in which at least one component producing heat on operation of the motor is arranged.

BACKGROUND OF THE INVENTION

Such electric motors are counted as belonging to the state of the art and serve for the most varied of drive purposes, for example of centrifugal pumps, compressors, stirring devices and likewise. Thereby, a control apparatus or likewise for the electric motor is arranged mostly directly on the motor housing or separately therefrom, and this control apparatus comprises a control apparatus housing or another further housing, in which at least one component producing heat on operation of the motor, for example a power resistor, a transistor, thyristor, triac or likewise, is arranged. With modern electric motors, the control apparatus often not only contains a winding commutation, but a frequency converter which renders it possible to activate the motor with practically infinite frequencies and thus rotation speeds. Such frequency converters contain power electronics which produce heat which is to be led away.

From DE 36 42 724 C2, it is counted as belonging to the state of the art to cool the further housing, and there, in particular the frequency converter housing, by way of the cooling airflow which is produced by a fan wheel seated on the motor shaft outside on the motor and which is led along the motor by way of a fan cowl. For this, the power electronics components producing heat are arranged in the region of this further housing, which is close to the ground.

Furthermore, it is counted as belonging to the state of the art to design the further housing on its outer side in a ribbed manner and to cool it by way of convection.

If is insufficient for the cooling, a separate fan can be provided outside on the housing and this fan leads the airflow into the housing in a targeted manner and thus cools it. An airflow can also be led through the housing. The arrangement of a separate, typically electromotorically driven cooling blower however has the disadvantage that it worsens the efficiency of the assembly and moreover that it represents an additional fault source and can prematurely fail.

Moreover, with pump assemblies, it is counted as belonging to the state of the art, to cool the power electronics of the frequency converter with liquid, but this per se is not so practical with electric motors.

SUMMARY OF THE INVENTION

Against this background, it is the object of the invention to design an electric motor of the known type, such that an effective cooling of the heat-producing components in the further housing is achieved with means which are simple with regard to design, wherein this cooling practically does not compromise the efficiency of the motor and functions in a reliable manner.

According to the invention, an electric motor is provided with a motor housing and with a further housing which comprises electric and/or electronic components. At least one component producing heat on operation of the motor is arranged in the further housing. At last one fluid-leading channel circuit is provided, which conductively connects the inside of the motor housing to the interior of the further housing.

The electric motor according to the invention and comprising a motor housing and a further housing which comprises electric and/or electronic components and in which at least one component producing heat on operation of the motor is arranged. According to the invention the motor is designed such that at least one fluid-leading channel circuit (channel circulation) is provided, which conductively connects the inside of the motor housing to the interior of the further housing.

The basic concept of the solution according to the invention is thus to provide a fluid-leading channel circuit between the motor housing and the further housing, so that a fluid suitable for cooling can be led in a cooling circuit which encompasses the inside of the motor housing and the inside of the further housing.

It is possible with the solution according to the invention, to reduce thermal peaks on the motor side as well as in particular on the housing side, specifically in the further housing, in which a fluid is led through this housing in the circuit. Thus, one can succeed in a roughly equal temperature level prevailing in both housings, which is to say in the motor housing and in the further housing. In particular, with a suitable design and/or control of the motor, this motor can serve as a heat sink for the heat which is typically produced by a frequency converter in a frequency converter housing as a further housing.

The further housing however advantageously receives a control apparatus, in particular however, a frequency converter. A control apparatus can for example serve for winding commutation or for a simplified speed control. Usually, heat-producing components such as electronic switches, power resistors or likewise are regularly constructed there, and these are advantageously cooled by way of the arrangement according to the invention.

The present invention can be particularly advantageously applied if a permanent magnet motor is applied as an electric motor. The efficiency of such motors has been significantly increased in recent years by way of the development of the permanent magnets, by which means the waste heat produced in the motor could also be significantly reduced. The invention is thus particularly advantageously applicable with the use of these motors, since the heat produced by the frequency converter at least additionally can also be led away via the motor itself or the motor housing. The application of a permanent magnet motor according to the invention is not limited to the use with a frequency transformer or frequency converter.

It is particularly simple with regard to design, if the fluid led in the channel circuit between the motor housing and the further housing is a gas, in particular air, since no particular provisions then need to be made with regard to design. In particular no problems then occur in the case of leakage of the coolant circuit. However, according to the invention, a liquid, typically an insulating liquid such as silicone oil for example can be used as a fluid, which has the advantage of an increased thermal conductivity and thermal capacity. Such coolants are particularly applied with electronic motors which are used underwater, for example with submersible pumps.

Different technical means can be applied, in order to produce the fluid flow in the channel circuit. Thus a convection flow can be achieved by way of a suitable arrangement and design of the circuit channel and this convention flow can be supported, as the case may be, by way of the application of one or more heat pipes. However, it is particularity advantageous if the fluid flow in the channel circuit is produced by way of the rotor of the motor itself which is present in any case. The rotor can be designed accordingly for this, for example by way of profiling its peripheral surface.

As a rule, with regard to design, it is simpler to provide an impeller on the shaft of the motor, for producing a fluid flow in the channel circuit. Such an impeller is formed by a fan wheel if gas, in particular air is applied as a fluid, whereas a pump impeller is used with the use of a cooling liquid. It is to be understood that, as the case may be, suitable guide vanes are provided on the stator side and/or motor housing side.

The impeller thereby is seated within the motor housing, in order to produce the fluid flow in the channel circuit, which is to say in the circuit formed by the motor housing and further housing.

Advantageously, additionally to the internal cooling circuit which is produced preferably by way of an impeller arranged within the motor housing, an impeller for producing an airflow along the outer side the motor housing and/or the further housing can also be provided on the motor shaft, as this is basically known from the previously mentioned state of the art according to DE 36 42 724 C2. The motor housing and, as the case may be, the further housing, can be subjected to a cooling airflow by way of this.

If the further housing is arranged on the motor housing or in the direct vicinity of this, it is then useful to design the leading of the fluid in the channel circuit such that the fluid flow in the motor housing and in the further housing is directed in a direction parallel to the motor housing or at an angle of maximally 25° thereto. The axial flow through the motor space as well as the further housing which mostly also mainly extends in this direction ensures a good heat distribution on account of the longer paths in the respective housings, in which the fluid is in contact with the components which produce or lead away heat and which are located therein.

The motor housing and the further housing are typically, but not necessarily also mechanically connected to one another. Such a mechanical connection can simultaneously also be designed as a thermally-conducive connection, which is advantageous.

It is particularly favorable with regard to design and thermal technology, if the motor housing and the further housing comprises at least one common housing wall. On the one hand, a very space-saving constructional size results by way of this, and on the other hand, in particular, if at least the common housing wall consists of a good heat-conductive material, in particular metal, also a heat exchange in the region of this housing wall.

According to a further development of the invention, one envisages grooves or channels for conveying fluid being provided in the rotor and/or stator of the motor, in order to realize an intensive heat exchange within the motor and a good through-flow ability. Such an arrangement is particularly advantageous with a leading of fluid in the channel circuit, with which the flow within the motor housing is directed essentially parallel to the motor axis, thus an axial through-flow takes place.

Advantageously, according to the invention, an essentially radial leading of the fluid is envisaged additionally to the axial leading of the fluid. For this, the motor housing comprises a conduit entry of a conduit coming from the further housing, as well as a conduit exit leading into the further housing, which run radially and are distanced in the axial direction of the motor and preferably lie in the same axial plane.

Alternatively, according to a further development of the invention, one can envisage an essentially radial/tangential flow through the motor housing. A guidance (vane) device which surrounds the impeller for producing a fluid flow in the channel circuit and which comprises an essentially radially running conduit exit into the further housing and an essentially radially arranged conduit entry common form the further housing, is then provided in the motor housing. Such a radial/tangential channel circuit leading has the advantage that it is largely independent of the rotor length, which is particularly advantageous for motors of different power sizes, which with the same motor housing dimensions differ only in the axial length of the rotor. Then the leading of the fluid can be produced by way of an impeller and a guidance device likewise surrounding this, independently of the rotor length, without it concerning the length of the stator, since the respective conduit exits lie in the region of the guidance device and not in the remaining region of the rotor/stator. With such an arrangement, it is advantageous if the conduit entry and conduit exit lie in the same radial plane, since then the guidance device can be designed as an intact, vane channel surrounding the impeller.

A conduit connection is advantageously formed by a recess in the housing wall, into which a conduit piece coming from the further housing accordingly engages or however which is covered by a recess in the wall of the further housing, said recess being flush with this. Inasmuch as both housings (motor housing and further housing) have a common wall, such a recess acts in order to create a conduit connection between the housings.

The design according to the invention can advantageously be applied with dry-runners, but may however also be applied with wet-runners without further ado, thus in particular with canned motors, as are common for the drive of centrifugal pumps.

The invention is hereinafter explained in more detail by way of embodiment examples represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
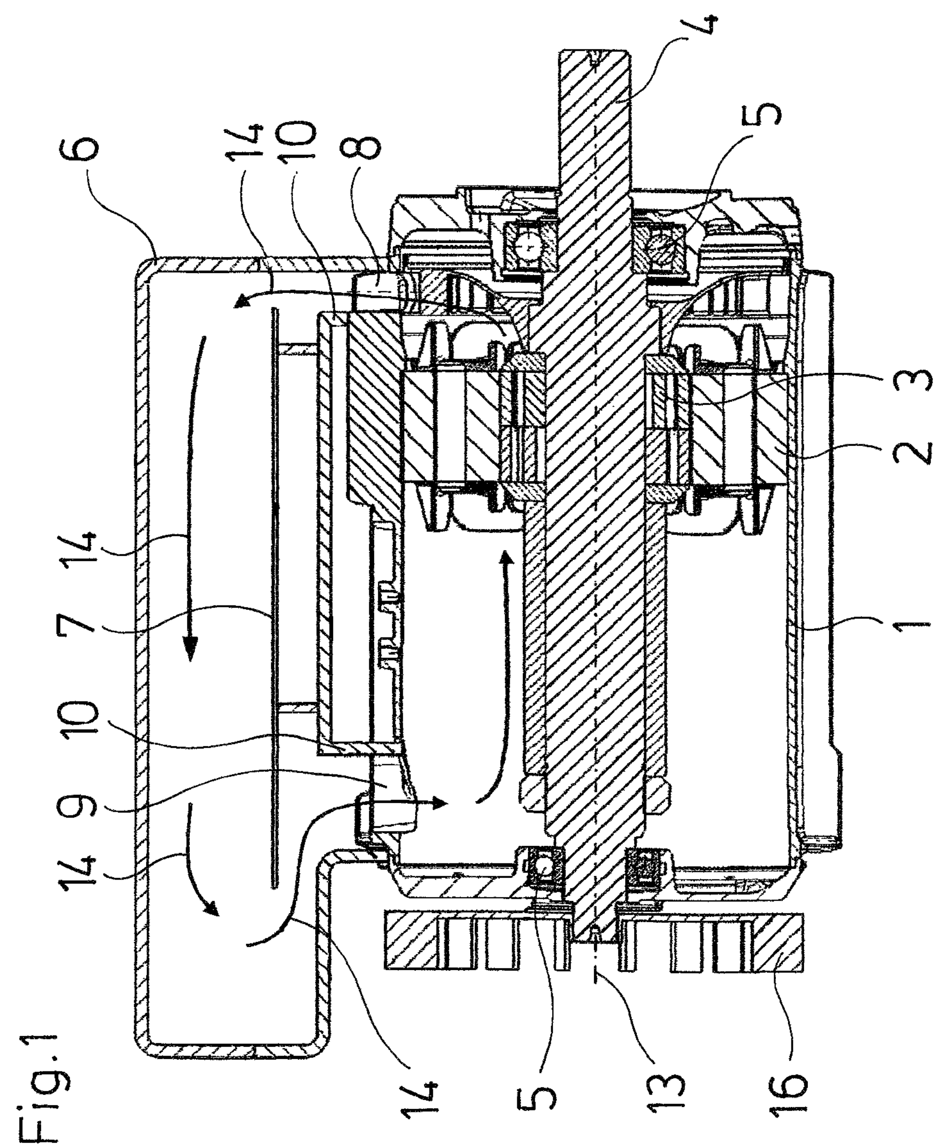
FIG. 1 is a greatly simplified schematic longitudinal sectional representation showing an electric motor with a frequency converter arranged thereon.

Referring to the drawings in particular, the basic construction of an electric motor according to the invention is to be deduced from the schematic sectioned representation according to FIG. 1. The electric motor comprises a motor housing 1, in which a stator 2 is arranged, in which a rotor 3 is rotatably mounted. The rotor 3 is rotatably mounted in the motor housing 1 by way of a rotor shaft. For this, bearings 5 are provided in the end-sides of the motor housing 1.

On the peripheral side, a further housing 6, here the housing of a frequency converter is provided on the motor housing 1 which is essentially round in cross section. This frequency converter housing 6 is arranged distanced to the motor housing 1 and accommodates the frequency converter electronics which contains the power electronics producing the heat and which is characterized in FIG. 1 at 7.

The frequency converter housing 6 on its side which faces the motor housing 1 comprises two conduit connections 8 and 9 which are formed by recesses in the housing base and which are conductively connected by way of pipe sections 10 to correspondingly flush recesses 11 and 12 arranged in the motor housing 1 and likewise forming conduit connections. Two channel connections which are distanced in the direction of the axis 13 of the motor and which connect the inside, thus the interior of the frequency converter housing 6 to the interior of the motor housing 1, are formed by the conduit connections 8, 9, the pipe sections 10 and the conduit connections 11, 12. By way of this, a channel circuit is formed, so that the air located in the motor housing 1 or in the frequency converter housing 6 can circulate, as is illustrated by way of arrows 14 in FIG. 1.

The air is thus led in the circuit, and the pressure difference necessary for this is produced by an inner fan wheel 15 which is seated on the motor shaft 4 and on operation of the motor co-rotates with the motor shaft 4, and in this manner produces an airflow which goes through the recess 12 via the pipe section 8 and the recess 8 into the frequency converter housing 6. The airflow 14 flows along the power electronics 7 in a direction parallel to the motor axis 13 through the frequency converter housing 6, in order at the other end to go through a recess forming the conduit connection 9, into the pipe section 10 and via the recess 11 again into the motor housing 1.

A likewise essentially axial throughflow is effected within the motor housing 1. The gap between the rotor 3 and the stator 2 which is represented in FIG. 1 is for a multitude of channels which, for example, can be formed by the grooves or slots which are typically present in the stator or also separate recesses. The airflow 14 then finally reaches the fan wheel 15 again where the circulation begins fresh.

The heat produced in the power electronics 7 of the frequency converter can be at least partly led away via the airflow 14 and given off to the motor, in particular to the motor housing which is cooled in a convective manner. In the embodiment variant represented in FIG. 1, an external fan wheel 16 which is likewise seated on the motor shaft 4 and is covered by a fan cowl not shown in FIG. 1 is provided additionally to the fan wheel 15 located within the motor housing 1. This external fan wheel 16 produces an airflow which flows along the periphery of the motor housing 1 and in this manner cools the motor housing 1 from the outside. As FIG. 1 illustrates, this airflow not only cools the motor housing 1, but also the lower side of the frequency converter housing 6.

Figures 2, 3, 4:
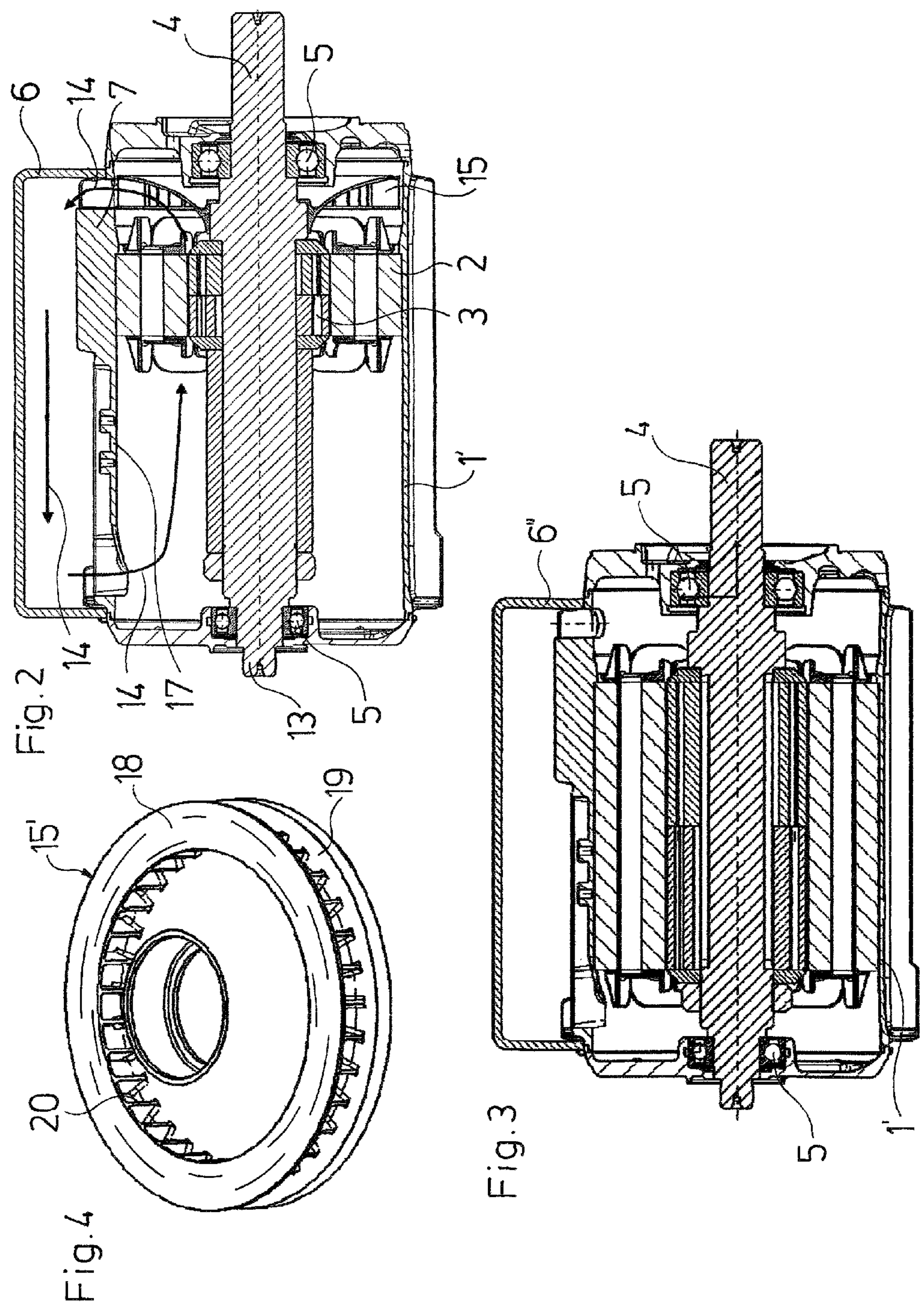
FIG. 2 is a longitudinal sectional view showing an electric motor with an integrated frequency converter.
FIG. 3 is an electric motor according to FIG. 2, with an alternative rotor.
FIG. 4 is a perspective representation showing a fan wheel of the motor according to FIG. 2.
Figure 5:
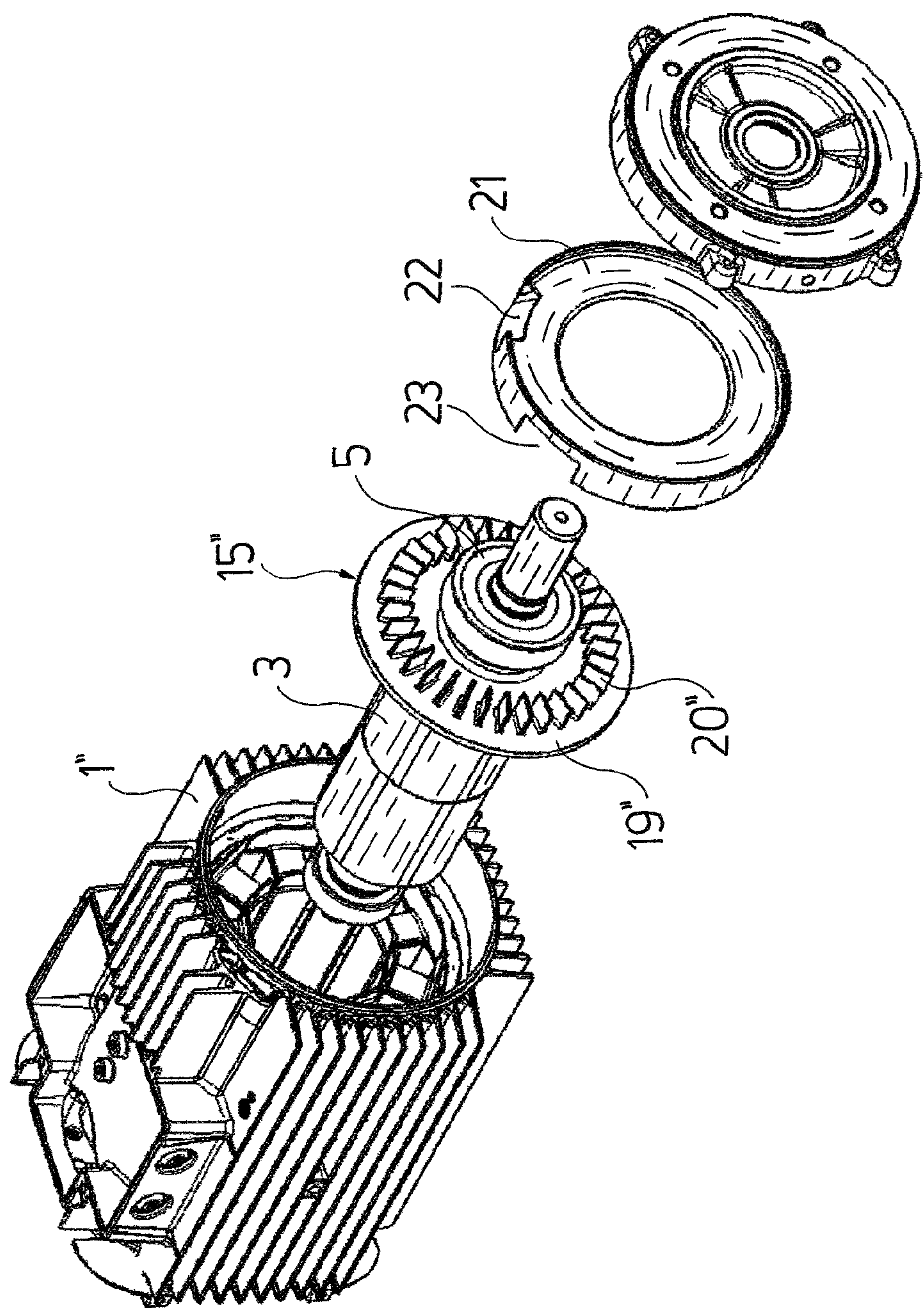
FIG. 5 is a partly exploded representation showing a further design of an electric motor without a frequency converter housing.
Figure 6:
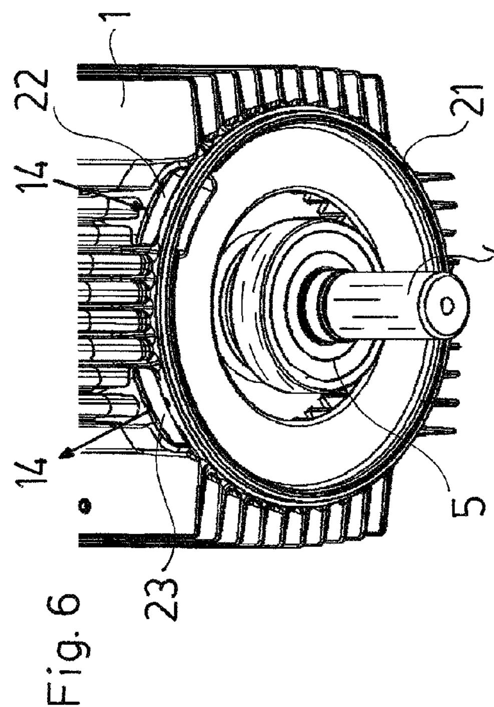
FIG. 6 is an enlarged perspective view of the drive-side end-side of the motor according to FIG. 5.
Figure 7:
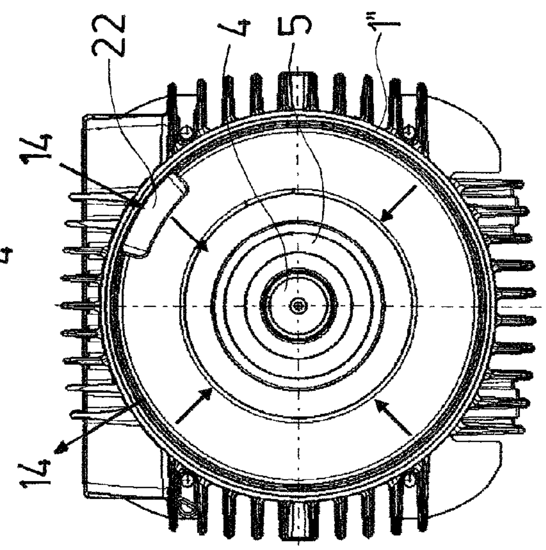
FIG. 7 is an end-view of the motor according to FIG. 5, in the axis direction of the motor shaft.

With the embodiment variant represented by way of FIG. 2, the frequency converter housing 6' is not arranged distanced to the motor housing 1', but is an integral constituent of this, which is to say that the base of the frequency converter housing 6' is formed by a wall 17 which at the same time is a wall of the motor housing F. The connection between the motor housing 1' and the frequency converter housing 6' is formed by two recesses in this wall 17. With this design, the motor merely comprises one internal fan wheel 15' which is designed as an axial/radial fan wheel. It comprises a shroud or cover plate 18 to the motor. The closed base body 19 extends radially from the shaft 4 to close to the inner periphery of the motor housing 1. Essentially, radially arranged blades 20 are provided between the shroud 18 and the base body 19. This inner fan wheel 15' is designed as one piece and as a plastic injection moulded part. It delivers the cooling air flowing through the stator 2 and motor 3 radially outwards into the frequency converter housing 6, in which the cooling airflow 14 flows parallel to the rotor axis 13 along the power electronics to the other end, in order to go through the base-side recess back into the motor housing F.

As can be deduced from a comparison of the axial extension of the rotor 3 and the stator 2 of FIGS. 2 and 3, the embodiment variant described by way of FIGS. 2 to 4 is provided for receiving different stator/rotor combinations, in order thus with only one motor housing 1' and only one frequency converter housing 6' to be able to cover a multitude of power stages, without having to change the motor design, disregarding the stator and rotor. The internal fan wheel 15' is not represented in FIG. 3 for the purpose of a better overview.

With the embodiment represented by way of FIGS. 5 to 8, the frequency converter housing is not shown for reasons of an improved overview, but only the motor whose construction corresponds basically to that previously described, wherein however an inner fan wheel 15" is provided which comprises a base body 19" directed to the motor and stator, and blades 20" extending radially from this, but no shroud. This internal fan wheel 15" cooperates with a guidance device 21 which surrounds the fan wheel 15" and on its peripheral side and at its free end-side in the region of the blades 20".

Figure 8:
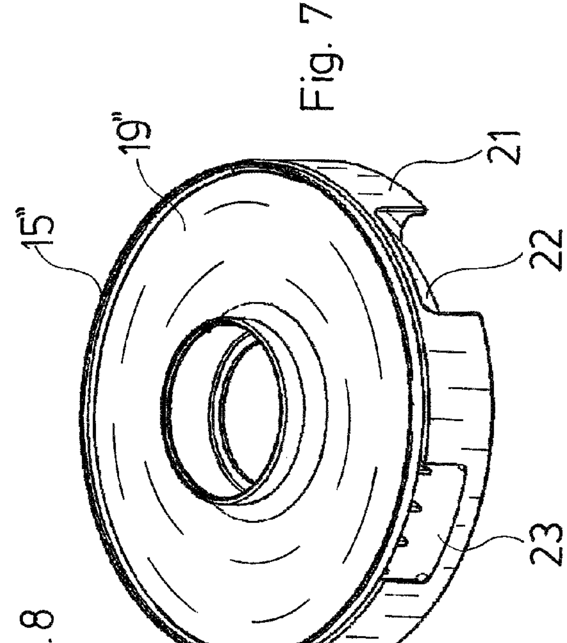
FIG. 8 is a perspective representation of the vane guidance device of the electric motor represented FIG. 5.

The guidance device 21 comprises two recesses 22 and 23 in its radial peripheral wall, which form the conduit connections to the frequency converter housing which is not represented. Thereby, the recess 22 as is evident from FIG. 8, is not only arranged radially, but also extends in the end-side of the guidance device 21 which is away from the stator 2, whereas the recess 23 is arranged in an exclusively radial manner. The guide device 21 thus encloses the fan wheel 15" radially in a complete manner and at its open end-side in an annular manner, so that a circulation flow 14 sets in on operation, as is represented by way of FIGS. 6 and 7.

The air coming from the frequency converter housing goes through the recess 22 into the motor housing 1' and is led essentially radially inwards at the end-side of the guidance device 21 which is away from the motor, where it gets into the suction region of the fan wheel 15". From there it is delivered essentially radially outwards and escapes through the radial recess 23 into the frequency converter housing. Here, therefore, the through-flow in the motor housing is given essentially at one end-side and the recesses 22 and 23 lie in the same radial plane. The flow arrangement within the frequency converter housing is not represented in the drawing but is designed such that the circulation flow 14 flows around the heat-producing components.

While specific embodiments of the invention have been shown and described in detail to illustrate the application of the principles of the invention, it will be understood that the invention may be embodied otherwise without departing from such principles.

The invention claimed is:

1. An electric motor comprising:

a motor comprising a stator and a rotor;

a motor shaft;

a motor housing with an inside, the motor housing supporting the stator and supporting the motor shaft, the rotor being mounted within the inside of the motor housing on the rotor shaft for rotation about a motor axis;

an impeller seated within the motor housing inside on the motor shaft for rotation therewith for producing a fluid flow, the impeller being seated within the inside of the motor housing and having a fluid intake drawing fluid over the rotor or through the motor or both over the rotor and through the motor and a radially outward fluid discharge;

an electric and/or electronic components housing directly adjacent to the motor housing and mechanically connected directly to the motor housing, radially outwardly of the motor housing, at a radial side of the motor housing, the components housing including at least one component, producing heat on operation of the motor, arranged in an interior of the further housing;

a radially running conduit exit defining a fluid passage from the motor housing inside, via the radially outward fluid discharge, directly into the further housing interior; and an essentially radially arranged conduit entry defining a fluid passage from the further housing directly into the motor housing inside, the motor housing inside defining a motor housing fluid path from the conduit entry, past the impeller, to the conduit exit and the components housing interior defining a components housing fluid path from the conduit exit to the conduit entry and the motor housing fluid path, the conduit exit, the components housing fluid path and the conduit entry defining a closed channel circuit with fluid being circulated in the channel circuit by the impeller and each of the motor housing fluid path and the further housing fluid path being directed in a direction parallel to the motor axis or at an angle up to 25° obliquely thereto, and the motor serving as a heat sink for the heat which is produced in the electric and/or electronic components housing to reduce thermal peaks on a motor side of the closed channel circuit as well as on an electric and/or electronic components side of the closed channel circuit whereby a nearly equal temperature level prevails in the motor housing and in the electric and/or electronic components housing.

2. An electric motor according to claim 1, further comprising a guidance device surrounding the impeller and cooperating with the impeller for producing the fluid flow in the channel circuit, the guidance device being provided in the motor housing and comprising at least a portion of the radially running conduit exit from the motor housing into the further housing.

3. An electric motor according to claim 2, wherein:

the conduit entry and the conduit exit lie in the same radial plane; and the motor housing and the further housing comprise at least one common housing wall.

4. An electric motor according to claim 1, further comprising a control apparatus wherein the further housing receives the control apparatus and the control apparatus includes a frequency converter.

5. An electric motor according to claim 1, wherein the motor is a permanent magnet motor.

6. An electric motor according to claim 1, further comprising another impeller for producing an airflow along the outer side of the motor housing and/or of the further housing, the another impeller also being seated on the motor shaft, wherein the fluid in the channel circuit is a gas.

7. An electric motor comprising:

a motor comprising a stator and a rotor;

a motor shaft;

a motor housing with an inside, the motor housing supporting the stator and supporting the motor shaft, the rotor being mounted within the inside of the motor housing on the rotor shaft for rotation about a motor axis;

an impeller seated within the motor housing inside on the motor shaft for rotation therewith for producing a fluid flow, the impeller being seated within the inside of the motor housing and having a fluid intake drawing fluid over the rotor or through the motor or both over the rotor and trough the motor and a radially outward fluid discharge;

an electric and/or electronic components housing directly adjacent to the motor housing and mechanically connected directly to the motor housing, radially outwardly of the motor housing, at one side of the motor housing, the components housing including at least one component, producing heat on operation of the motor, arranged in an interior of the further housing;

a radially running conduit exit defining a fluid passage from the motor housing inside, via the radially outward fluid discharge, directly into the further housing interior; and an essentially radially arranged conduit entry defining a fluid passage from the further housing directly into the motor housing inside, the motor housing inside defining a motor housing fluid path from the conduit entry, past the impeller, to the conduit exit and the components housing interior defining a components housing fluid path from the conduit exit to the conduit entry and the motor housing fluid path, the conduit exit, the components housing fluid path and the conduit entry defining a closed channel circuit with fluid being circulated in the channel circuit by the impeller and each of the motor housing fluid path and the further housing fluid path being directed in a direction parallel to the motor axis or at an angle up to 25° obliquely thereto, and the motor serving as a heat sink for the heat which is produced in the electric and/or electronic components housing to reduce thermal peaks on a motor side of the closed channel circuit as well as on an electric and/or electronic components side of the closed channel circuit whereby a nearly equal temperature level prevails in the motor housing and in the electric and/or electronic components housing.

8. An electric motor according to claim 7, further comprising a guidance device surrounding the impeller and cooperating with the impeller for producing the fluid flow in the channel circuit, the guidance device being provided in the motor housing and comprising at least a portion of the radially running conduit exit from the motor housing into the further housing.

9. An electric motor according to claim 8, wherein:

the conduit entry and the conduit exit lie in the same radial plane; and the motor housing and the further housing comprise at least one common housing wall.

10. An electric motor according to claim 7, further comprising a control apparatus wherein the further housing receives the control apparatus and the control apparatus includes a frequency converter.

11. An electric motor according to claim 7, wherein the motor is a permanent magnet motor.

12. An electric motor according to claim 7, further comprising another impeller for producing an airflow along the outer side of the motor housing and/or of the further housing, the another impeller also being seated on the motor shaft, wherein the fluid in the channel circuit is a gas.

13. An electric motor comprising:

a motor comprising a stator and a rotor;

a motor shaft;

a motor housing with an inside, the motor housing supporting the stator and supporting the motor shaft, the rotor being mounted within the inside of the motor housing on the rotor shaft for rotation about a motor axis;

an impeller seated within the motor housing inside on the motor shaft for rotation therewith for producing a fluid flow, the impeller being seated within the inside of the motor housing and having a fluid intake drawing fluid over the rotor or through the motor or both over the rotor and trough the motor and a radially outward fluid discharge;

an electric and/or electronic components housing directly adjacent to the motor housing and mechanically connected directly to the motor housing, radially outwardly of the motor housing, at one side of the motor housing, the one side being parallel to a longitudinal axis of the motor housing, the components housing including at least one component, producing heat on operation of the motor, arranged in an interior of the further housing;

a radially running conduit exit defining a fluid passage from the motor housing inside, via the radially outward fluid discharge, directly into the further housing interior; and an essentially radially arranged conduit entry defining a fluid passage from the further housing directly into the motor housing inside, the motor housing inside defining a motor housing fluid path from the conduit entry, past the impeller, to the conduit exit and the components housing interior defining a components housing fluid path from the conduit exit to the conduit entry and the motor housing fluid path, the conduit exit, the components housing fluid path and the conduit entry defining a closed channel circuit with fluid being circulated in the channel circuit by the impeller and each of the motor housing fluid path and the further housing fluid path being directed in a direction parallel to the motor axis or at an angle up to 25° obliquely thereto, and the motor serving as a heat sink for the heat which is produced in the electric and/or electronic components housing to reduce thermal peaks on a motor side of the closed channel circuit as well as on an electric and/or electronic components side of the closed channel circuit whereby a nearly equal temperature level prevails in the motor housing and in the electric and/or electronic components housing.

14. An electric motor according to claim 13, further comprising a guidance device surrounding the impeller and cooperating with the impeller for producing the fluid flow in the channel circuit, the guidance device being provided in the motor housing and comprising at least a portion of the radially running conduit exit from the motor housing into the further housing.

15. An electric motor according to claim 14, wherein:

the conduit entry and the conduit exit lie in the same radial plane; and the motor housing and the further housing comprise at least one common housing wall.

16. An electric motor according to claim 13, further comprising a control apparatus wherein the further housing receives the control apparatus and the control apparatus includes a frequency converter.

17. An electric motor according to claim 13, wherein the motor is a permanent magnet motor.

18. An electric motor according to claim 13, further comprising another impeller for producing an airflow along the outer side of the motor housing and/or of the further housing, the another impeller also being seated on the motor shaft, wherein the fluid in the channel circuit is a gas.

* * * * *